(12) United States Patent
Wilkens

(10) Patent No.: US 11,155,341 B2
(45) Date of Patent: Oct. 26, 2021

(54) REDUNDANT FLY-BY-WIRE SYSTEMS WITH FAULT RESILIENCY

(71) Applicant: HONEYWELL INTERNATIONAL INC., Morris Plains, NJ (US)

(72) Inventor: Dean Wilkens, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 637 days.

(21) Appl. No.: 16/048,612

(22) Filed: Jul. 30, 2018

(65) Prior Publication Data

US 2020/0031454 A1 Jan. 30, 2020

(51) Int. Cl.
*B64C 13/50* (2006.01)
*H04L 12/40* (2006.01)

(52) U.S. Cl.
CPC .......... *B64C 13/505* (2018.01); *B64C 13/503* (2013.01); *H04L 12/40* (2013.01); *H04L 2012/4028* (2013.01); *H04L 2012/40215* (2013.01)

(58) Field of Classification Search
CPC ..... B64C 13/505; B64C 13/503; H04L 12/40; H04L 2012/40215; H04L 2012/4028
See application file for complete search history.

(56) References Cited

U.S. PATENT DOCUMENTS

| | | | |
|---|---|---|---|
| 4,472,780 A * | 9/1984 | Chenoweth | G05D 1/0077 244/194 |
| 4,644,538 A | 2/1987 | Cooper et al. | |
| 5,493,497 A | 2/1996 | Buus | |
| 6,860,452 B2 * | 3/2005 | Bacon | B64C 13/505 244/194 |
| 7,031,810 B2 | 4/2006 | Foch et al. | |
| 7,337,044 B2 | 2/2008 | Platzer et al. | |
| 8,538,602 B2 | 9/2013 | Brot | |
| 8,690,101 B2 | 4/2014 | Ahmad et al. | |
| 9,873,505 B2 | 1/2018 | Bara et al. | |
| 9,932,108 B1 * | 4/2018 | Viele | B64C 13/503 |

(Continued)

FOREIGN PATENT DOCUMENTS

| | | |
|---|---|---|
| EP | 3254960 A1 | 12/2017 |
| WO | 9529434 A1 | 11/1995 |

OTHER PUBLICATIONS

B. Dotega & P. Rzucidlo (2007) Controllers for fault tolerant actuators, Aviation, 11:1, 23-27.

*Primary Examiner* — Justin M Benedik
(74) *Attorney, Agent, or Firm* — Lorenz & Kopf, LLP

(57) ABSTRACT

Aircraft fly-by-wire systems and related vehicle electrical systems are provided. In one embodiment, an electrical system suitable for use with a control surface of a vehicle, such as an aircraft, is provided. The electrical system includes a plurality of communications buses and a plurality of control modules, wherein each of the plurality of control modules is connected to a respective subset of the plurality of communications buses that is unique among the plurality of control modules, and a plurality of actuation control modules associated with the control surface, wherein each of the plurality of actuation control modules is connected to a respective subset of the plurality of communications buses that is unique among the plurality of actuation control modules. Thus, each of the control modules is isolated from at least one of the communications buses.

20 Claims, 1 Drawing Sheet

(56) References Cited

U.S. PATENT DOCUMENTS

2006/0100750 A1    5/2006  Platzer et al.
2017/0109297 A1    4/2017  Chang et al.
2017/0355449 A1*  12/2017  Bapat .................... B64C 13/503
2019/0036732 A1*   1/2019  Dormiani ................ B64C 39/04

* cited by examiner

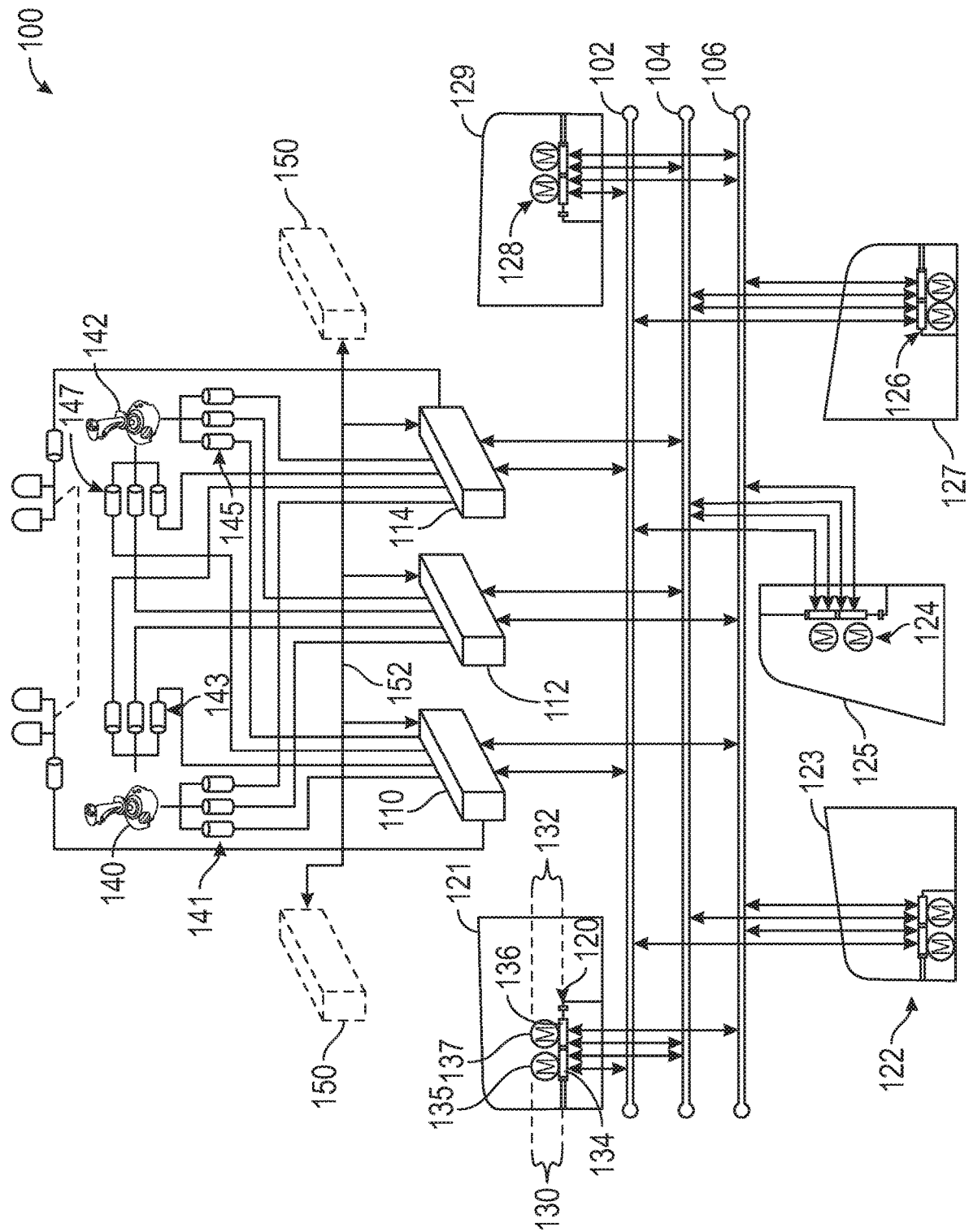

REDUNDANT FLY-BY-WIRE SYSTEMS WITH FAULT RESILIENCY

TECHNICAL FIELD

The subject matter described herein relates generally to aircraft systems, and more particularly, embodiments of the subject matter relate to redundant fly-by-wire systems configured to achieve fault resiliency without increasing wiring costs and complexity.

BACKGROUND

In some modern aircraft, traditional mechanical flight control systems have been replaced with electrically controlled actuators, often referred to as fly-by-wire. Instead of mechanical linkages between cockpit controls and flight control surfaces, electrical signals are utilized to communicate movements of cockpit controls to actuators for the flight control surfaces. For safety purposes, fly-by-wire systems often employ redundancy to ensure they are fail operational; however, this often increases the amount of wiring and interfaces required. Data integrity may further increase the amount of wiring, circuitry, or other costs. Accordingly, it is desirable to provide a resilient fly-by-wire system that seeks to minimize the amount of wiring and associated costs. Other desirable features and characteristics will become apparent from the subsequent detailed description and the appended claims, taken in conjunction with the accompanying drawings and the foregoing technical field and background.

BRIEF SUMMARY

Vehicle electrical systems suitable for use with an aircraft are provided. One exemplary vehicle electrical system includes a bus arrangement comprising a plurality of buses, a first control module coupled to a first subset of the plurality of buses, a second control module coupled to a second subset of the plurality of buses, and a third control module coupled to a third subset of the plurality of buses. The first subset includes a first bus and a second bus, the second subset includes the first bus and a third bus, and the third subset includes the second bus and the third bus. A first actuation arrangement is coupled to a fourth subset of the plurality of buses that includes the first bus, and a second actuation arrangement is coupled to a fifth subset of the plurality of buses that includes the second bus. The first subset, the second subset, and the third subset are different from one another, and the fourth subset and the fifth subset are different from one another.

In another embodiment, an electrical system suitable for use with a flight control surface of an aircraft is provided. The electrical system includes a plurality of communications buses, a plurality of flight control modules, wherein each of the plurality of flight control modules is connected to a respective subset of the plurality of communications buses that is unique among the plurality of flight control modules, and a plurality of actuation control modules associated with the flight control surface, wherein each of the plurality of actuation control modules is connected to a respective subset of the plurality of communications buses that is unique among the plurality of actuation control modules.

In yet another embodiment, an aircraft fly-by-wire system is provided. The system includes a plurality of controller area network (CAN) buses, a plurality of flight control modules, and a plurality of actuation control modules associated with a flight control surface. Each of the plurality of flight control modules is connected to a distinct subset of the plurality of CAN buses, each of the plurality of actuation control modules is connected to a different subset of the plurality of CAN buses, each of the plurality of actuation control modules is coupled to at least two flight control modules of the plurality of flight control modules via the different subset of the plurality of CAN buses associated therewith, and each of the plurality of actuation control modules is isolated from at least one of the plurality of CAN buses.

Other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with FIG. 1, which is a block diagram illustrating a fly-by-wire system suitable for use with an aircraft in accordance with one or more exemplary embodiments.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein relate to electrically-controlled vehicle systems. For purposes of explanation, the subject matter is described herein primarily in the context of aircraft where flight control surfaces are controlled using electrical signals, however, the subject matter is not necessarily limited to use with aircraft and may be implemented in an equivalent manner for other types vehicles (e.g., automotive vehicles, marine vessels, or the like).

FIG. 1 depicts an exemplary embodiment of a fly-by-wire system 100 including a plurality of communications buses 102, 104, 106, a plurality of flight control modules 110, 112, 114, and a plurality of actuation systems 120, 122, 124, 126, 128 associated with a plurality of flight control surfaces 121, 123, 125, 127, 129. In the illustrated embodiment, the first flight control module 110 is coupled to a first subset of the buses (e.g., buses 102 and 106), the second flight control module 112 is coupled to a second subset of the buses (e.g., buses 104 and 106), and the third flight control module 114 is coupled to a third subset of the buses (e.g., buses 102 and 104), with each of the subsets of buses being unique, distinct, or otherwise different from one another. In other words, none of the flight control modules 110, 112, 114 are coupled to a common subset of the buses 102, 104, 106, and each of the flight control modules 110, 112, 114 is isolated from at least one of the buses 102, 104, 106 by the absence of a physical electrical connection with the respective isolated bus 102, 104, 106 (e.g., the first flight control module 110 is isolated from the second bus 104, the second flight control module 112 is isolated from the first bus 102, and the third flight control module 114 is isolated from the third bus 106).

In the illustrated embodiment, the actuation systems 120, 122, 124, 126, 128 include at least a pair of redundant actuation arrangements, with each actuation arrangement including an actuator control module and a corresponding actuator associated therewith. For example, a first actuation arrangement 130 of the first actuation system 120 includes a first actuator control module 134 that is coupled to or otherwise configured to control operation of a first actuator 135, such as a motor, that is capable of adjusting a position or orientation of the first flight control surface 121. A second actuation arrangement 132 of the first actuation system 120 includes a second actuator control module 136 that is coupled to or otherwise configured to control operation of a second actuator 137 that is similarly capable of adjusting the position or orientation of the first flight control surface 121. Each actuation arrangement of the actuation systems 120, 122, 124, 126, 128 is coupled to a distinct or unique subset of the buses 102, 104, 106 relative to other actuation arrangements of the respective actuation system 120, 122, 124, 126, 128. For example, the first actuator control module 134 of the first actuation arrangement 130 is coupled to a first subset of the buses (e.g., buses 102 and 104) that is different from a second subset of buses (e.g., buses 104 and 106) that are coupled to the actuator control module 136 of the second actuation arrangement 132. In exemplary embodiments, each of the actuator control modules 134, 136 is coupled to all of the flight control modules 110, 112, 114 via its respective subset of buses 102, 104, 106 it is connected to, thereby achieving a desired level of redundancy without triplicate bus connections or interfaces for either the actuator control modules 134, 136 or the flight control modules 110, 112, 114. At the same time, in exemplary embodiments, each of the actuator control modules 134, 136 of a respective actuation system 120, 122, 124, 126, 128 is isolated from at least one of the buses 102, 104, 106 by the absence of a physical electrical connection with the respective isolated bus 102, 104, 106 (e.g., the first actuator control module 134 is isolated from the third bus 106 and the second actuator control module 136 is isolated from the first bus 102).

The flight control modules 110, 112, 114 generally represent the processing system, processing device, hardware, circuitry, logic, software, firmware and/or other components configured to receive signals indicative of a sensed or measured position, orientation, or adjustment to user interface devices 140, 142 in the cockpit of the aircraft and convert the inputs or adjustments received at the user interface devices 140, 142 into corresponding command signals for one or more flight control surfaces 121, 123, 125, 127, 129 and output or otherwise provide the command signals to the one or more flight control surfaces 121, 123, 125, 127, 129 via the subset of buses 102, 104, 106 that the respective flight control module 110, 112, 114 is coupled to. For purposes of explanation, the flight control modules 110, 112, 114 may alternatively be referred to herein as flight control computers. Each flight control computer 110, 112, 114 may be implemented or realized using any suitable processing system and/or device, such as, for example, one or more processors, central processing units (CPUs), controllers, microprocessors, microcontrollers, processing cores and/or other hardware computing resources configured to support the operation described herein. In this regard, each flight control computer 110, 112, 114 may include or access a data storage element (or memory) capable of storing programming instructions for execution that, when read and executed by the flight control computer 110, 112, 114, cause the flight control computer 110, 112, 114 to support operations of the fly-by-wire system 100.

The cockpit user interface devices 140, 142 onboard the aircraft could be realized as a keypad, touchpad, keyboard, mouse, touch panel (or touchscreen), joystick, knob, line select key or another suitable device adapted to receive input from a user. In the illustrated embodiment, the cockpit user interface devices 140, 142 are realized as joysticks including respective sets of redundant sensors 141, 145 configured to sense the position of a respective joystick 140, 142 in a first reference direction (e.g., a horizontal or x-reference direction) and additional sets of sensors 143, 147 configured to sense the position of the respective joystick 140, 142 in a second reference direction (e.g., a vertical or y-reference direction). Each sensor of each set 141, 143, 145, 147 is coupled to a respective one of the flight control computers 110, 112, 114.

One or more avionics systems 150 are also communicatively coupled to each of the flight control computers 110, 112, 114 via a data bus 152. The avionics systems 150 support navigation, flight planning, and other aircraft control functions in a conventional manner and provide real-time data and/or information regarding the operation of the aircraft to the flight control computers 110, 112, 114 for analysis in conjunction with the sensed user interface device data received from the sensors 141, 143, 145, 147. Practical embodiments will likely include one or more of the following avionics systems suitably configured to support operation of the aircraft: a flight management system (FMS), a navigation system, a communications system, an autopilot system, an autothrust system, a weather system, an air traffic management system, a radar system, a traffic avoidance system, hydraulics systems, pneumatics systems, environmental systems, electrical systems, engine systems, trim systems, lighting systems, crew alerting systems, electronic checklist systems, an electronic flight bag and/or another suitable avionics system.

Based on the data or information received from the respective avionics systems 150 and the sensed position or adjustment to a respective user interface device 140, 142, each of the flight control computers 110, 112, 114 redundantly determines commands for controlling the position of or otherwise operating one or more of the flight control surfaces 121, 123, 125, 127, 129. In this regard, the flight control surfaces 121, 123, 125, 127, 129 generally represent the aeilerons, flaps, rudders, spoilers, slats, stabilizers, elevators, or other aerodynamic devices capable of adjusting the attitude of the aircraft. The actuator control modules 134, 136 of the respective actuation systems 120, 122, 124, 126, 128 generally represent the processing system, processing device, hardware, circuitry, logic, software, firmware and/or other components of the respective actuation systems 120, 122, 124, 126, 128 that are capable of receiving a command for the respective flight control surfaces 121, 123, 125, 127, 129 and generating corresponding commands for operating the motor or other actuator 135, 137 associated therewith to adjust or otherwise control the position of the respective flight control surface 121, 123, 125, 127, 129 to track the commands provided by one or more of the flight control computers 110, 112, 114. IN this regard, the actuator control modules 134, 136 may be implemented or realized using any suitable processing system and/or device, such as, for example, one or more processors, central processing units (CPUs), controllers, microprocessors, microcontrollers, processing cores and/or other hardware computing resources configured to support the operation described herein.

In exemplary embodiments, each of the buses 102, 104, 106 is realized as a Controller Area Network (CAN) bus, with each of the flight control computers 110, 112, 114 and actuation systems 120, 122, 124, 126, 128 including (or being coupled to a respective CAN bus 102, 104, 106 via)

a respective CAN transceiver (or similar communications interface). For example, a first actuation control module 134 may include or be coupled to a first CAN transceiver that is coupled to the first CAN bus 102, and also include or be coupled to a second CAN transceiver that is coupled to the second CAN bus 104. Similarly, the first flight control computer 110 may include or be coupled to a first CAN transceiver that is coupled to the first CAN bus 102, and include or be coupled to a second CAN transceiver that is coupled to the third CAN bus 106.

During operation of the aircraft, each of the flight control computers 110, 112, 114 continually analyzes the outputs of the user interface sensors 141, 143, 145, 147 and the onboard avionics systems 150 to determine corresponding commands for how the respective flight control surfaces 121, 123, 125, 127, 129 should be operated in response to adjustments or changes to the user interface devices 140, 142 substantially in real-time. For each respective flight control surface 121, 123, 125, 127, 129, each of the flight control computers 110, 112, 114 generates a corresponding position command that is encoded into a CAN message having a header that identifies the appropriate actuation system 120, 122, 124, 126, 128 and/or flight control surface 121, 123, 125, 127, 129 as the intended recipient for that command, and each of the flight control computers 110, 112, 114 outputs, transmits, or otherwise provides the resultant message to the respective subset of CAN buses 102, 104, 106 that respective flight control computer 110, 112, 114 is connected to. The actuator control modules 134, 136 of each of the actuation systems 120, 122, 124, 126, 128 continually monitors the respective subset of CAN buses 102, 104, 106 connected thereto for messages identifying its associated flight control surface 121, 123, 125, 127, 129 as the intended recipient. In response to identifying a message intended for its associated flight control surface 121, 123, 125, 127, 129, the actuator control module 134, 136 decodes, parses, or otherwise analyzes the message to identify the commanded adjustment or position for its associated flight control surface 121, 123, 125, 127, 129 and generates corresponding motor commands for operating a motor 135, 137 to achieve the commanded adjustment to the flight control surface 121, 123, 125, 127, 129. In exemplary embodiments, a cyclic redundancy check (CRC) or similar coding schemes may be utilized to protect against communications errors and improve or ensure the integrity of the messages received by the actuator control modules 134, 136.

The subject matter described herein provides independent communication paths that achieve relatively high availability by maintaining support for communications between at least one flight control computer and all of the flight control surfaces in the event of an adverse condition or another anomaly or problem with respect to two or more other flight control computers. For example, in an embodiment having three flight control computers, after any one or any two flight control computers experiences problems, the remaining third flight control computer still has the ability to transmit commands to all of the actuation controllers. Additionally, a problem with respect to any individual flight control computer or actuation controller cannot adversely degrade all of the CAN buses because no control module is connected to each of the CAN buses. In this regard, avoiding fully redundant physical electrical connections between all flight control computers and actuator control modules helps ensure that potential common cause electrical shorts or high voltage faults do not propagate across all CAN buses and/or all flight control computers. Relatively high data integrity may also be achieved using CRCs with CAN messages addressed to individual actuators (in addition to galvanic isolation or other isolation between CAN buses). Additionally, the subject matter described herein requires fewer wires than using ARINC 429 (which may require wrap back data buses for monitoring data transmissions and additional signals such as logic discretes to disable actuators when a fault is detected) or other approaches or techniques (e.g., point-to-point connections with intervening logic devices), thereby reducing costs and weight for achieving the same level of redundancy without compromising data integrity. It should be noted that although FIG. 1 depicts a fly-by-wire system 100 that includes three buses 102, 104, 106, three flight control computers 110, 112, 114, and two actuation arrangements 130, 132 per flight control surface, it will be appreciated that the subject matter described herein is not necessarily limited to any particular number of buses, flight control computers, or actuation arrangements per flight control surface. In this regard, other embodiments may include more than three buses, more than three flight control computers, and/or more than two actuation arrangements per flight control surface, as may be desired to achieve a desired level of redundancy or reliability for a particular application.

For the sake of brevity, conventional techniques related to fly-by-wire systems, avionics systems, avionics standards, avionics installations, communications buses, communications protocols, encoding and/or decoding, formatting, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. Thus, although FIG. 1 may depict direct electrical connections between components, alternative embodiments may employ intervening circuit elements and/or components while functioning in a substantially similar manner.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly coupled to one another, additional intervening elements, devices, features, or components may be present in an embodiment of the depicted subject matter. In addition, certain terminology may also be used in the following description for the purpose of reference only, and thus are not intended to be limiting. For example, the terms "first", "second" and other such numerical terms referring to structures do not imply a sequence or order unless clearly indicated by the context.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A vehicle electrical system comprising:
    a bus arrangement comprising a plurality of buses;
    a first control module coupled to a first subset of the plurality of buses, the first subset including a first bus and a second bus;
    a second control module coupled to a second subset of the plurality of buses, the second subset including the first bus and a third bus;
    a third control module coupled to a third subset of the plurality of buses, the third subset including the second bus and the third bus;
    a first actuation arrangement coupled to a fourth subset of the plurality of buses, the fourth subset including the first bus; and
    a second actuation arrangement coupled to a fifth subset of the plurality of buses, the fifth subset including the second bus, wherein:
        the first, second and third subsets are different; and
        the fourth and fifth subsets are different.

2. The vehicle electrical system of claim 1, wherein the plurality of buses comprises a plurality of controller area network (CAN) buses.

3. The vehicle electrical system of claim 2, further comprising:
    a user interface device coupled to each of the first, second, and third control modules; and
    a flight control surface coupled to each of the first and second actuation arrangements.

4. The vehicle electrical system of claim 1, further comprising:
    a user interface device coupled to each of the first, second, and third control modules; and
    a flight control surface coupled to each of the first and second actuation arrangements.

5. The vehicle electrical system of claim 1, wherein:
    the plurality of buses comprises a plurality of controller area network (CAN) buses;
    the first bus comprises a first CAN bus;
    the second bus comprises a second CAN bus;
    the third bus comprises a third CAN bus; and
    one of the fourth and fifth subsets includes the third CAN bus.

6. The vehicle electrical system of claim 1, further comprising a third actuation arrangement coupled to a sixth subset of the plurality of buses, wherein the sixth subset is different from the fourth subset and the fifth subset.

7. The vehicle electrical system of claim 1, wherein the first control module is not coupled to the third bus.

8. The vehicle electrical system of claim 7, wherein the second control module is not coupled to the second bus.

9. The vehicle electrical system of claim 8, wherein the third control module is not coupled to the first bus.

10. The vehicle electrical system of claim 1, wherein the third control module is not coupled to the first bus.

11. The vehicle electrical system of claim 10, wherein the first control module is not coupled to the third bus and the second control module is not coupled to the second bus.

12. The vehicle electrical system of claim 1, further comprising a flight control surface coupled to each of the first and second actuation arrangements, wherein:
    the plurality of buses comprises a plurality of controller area network (CAN) buses; and
    each of the first control module, the second control module, and the third control module is configured to:
        determine a command for operating the flight control surface;
        generate a CAN message addressed for the flight control surface and including the command; and
        output the CAN message to the respective one of the first subset, the second subset, and the third subset coupled to the respective one of the first control module, the second control module, and the third control module.

13. The vehicle electrical system of claim 12, further comprising a user interface device coupled to each of the first, second, and third control modules, wherein each of the first control module, the second control module, and the third control module is configured to determine the command for operating the flight control surface based at least in part on an adjustment to the user interface device.

14. The vehicle electrical system of claim 1, wherein each of the first control module, the second control module, the third control module, the first actuation arrangement, and the second actuation arrangement is isolated from at least one of the plurality of buses.

15. An electrical system suitable for use with a flight control surface of an aircraft, the electrical system comprising:
    a plurality of communications buses;
    a plurality of flight control modules, wherein each of the plurality of flight control modules is connected to a respective subset of the plurality of communications buses that is unique among the plurality of flight control modules; and
    a plurality of actuation control modules associated with the flight control surface, wherein each of the plurality of actuation control modules is connected to a respective subset of the plurality of communications buses that is unique among the plurality of actuation control modules, wherein:
        a first flight control module of the plurality of flight control modules is coupled to a first subset of the plurality of communications buses, the first subset including a first bus and a second bus;
        a second flight control module of the plurality of flight control modules is coupled to a second subset of the plurality of communications buses, the second subset including the first bus and a third bus;

a third flight control module of the plurality of flight control modules is coupled to a third subset of the plurality of communications buses, the third subset including the second bus and the third bus;

a first actuation control module of the plurality of actuation control modules is coupled to a fourth subset of the plurality of communications buses, the fourth subset including the first bus;

a second actuation control module of the plurality of actuation control modules is coupled to a fifth subset of the plurality of communications buses, the fifth subset including the second bus;

the first, second and third subsets are different; and the fourth and fifth subsets are different.

16. The electrical system of claim 15, wherein the plurality of communications buses comprises at least three communications buses and the plurality of flight control modules comprises at least three flight control modules.

17. The electrical system of claim 16, wherein each of the plurality of actuation control modules is not connected to at least one of the plurality of flight control modules.

18. The electrical system of claim 15, wherein each of the plurality of actuation control modules is not connected to at least one of the plurality of flight control modules.

19. The electrical system of claim 15, further comprising a plurality of actuators coupled to the flight control surface and operable to adjust a position of the flight control surface, wherein each of the plurality of actuation control modules is coupled to a respective one of the plurality of actuators.

20. An aircraft fly-by-wire system comprising:

a plurality of controller area network (CAN) buses;

a plurality of flight control modules, wherein each of the plurality of flight control modules is connected to a distinct subset of the plurality of CAN buses; and a plurality of actuation control modules associated with a flight control surface, wherein:

each of the plurality of actuation control modules is connected to a different subset of the plurality of CAN buses;

each of the plurality of actuation control modules is coupled to at least two flight control modules of the plurality of flight control modules via the different subset of the plurality of CAN buses associated therewith; and each of the plurality of actuation control modules is isolated from at least one of the plurality of CAN buses.

* * * * *